United States Patent [19]
Arimura

[11] 3,749,826
[45] July 31, 1973

[54] COLOR TELEVISION SIGNAL REPRODUCING SYSTEM

[75] Inventor: Ichiro Arimura, Kyoto, Japan

[73] Assignee: Matsushita Electric Industrial Co. Ltd., Kadoma-shi, Osaka, Japan

[22] Filed: May 11, 1971

[21] Appl. No.: 142,329

[30] Foreign Application Priority Data

May 13, 1970 Japan ................................ 45/41239

[52] U.S. Cl. ............................................ 178/5.4 CD
[51] Int. Cl. ............................................ H04n 9/02
[58] Field of Search ....................... 178/69.5 CB, 5.4, 178/5.4 SY, 5.4 CD

[56] References Cited

UNITED STATES PATENTS

| | | | |
|---|---|---|---|
| 3,629,491 | 12/1971 | Dann | 178/5.4 CD |
| 3,609,223 | 9/1971 | Tajiri | 178/5.4 CD |
| 3,614,305 | 10/1971 | Hidaka | 178/5.4 CD |

*Primary Examiner*—Richard Murray
*Attorney*—Stevens, Davis, Miller & Mosher

[57] ABSTRACT

A color television signal reproducing system in which a NTSC composite color television signal recovered from a magnetic recording and reproducing system such as a VTR and containing timing error information is processed to produce a continuous reference signal locked to timing variations in the horizontal sync signal which is separated from the composite signal. The composite signal is processed with the reference signal thus derived by means of balanced modulation to obtain a timing error corrected color subcarrier signal containing reduced timing error components.

4 Claims, 4 Drawing Figures

COLOR TELEVISION SIGNAL REPRODUCING SYSTEM

This invention relates to the removal of timing irregularities or variations introduced into the NTSC composite color television signal in the course of recording and reproducing thereof by a recording and reproducing system such as a VTR either directly or by the low frequency shifting of the color signal component thereof.

More specifically, the invention concerns the partial or entire cancellation of timing errors in the recovered color signal by processing the color signal in the presence of a frequency multiplied reference signal, which is produced from the separated horizontal sync signal and is phase locked to the timing variations in the sync signal.

The invention is useful where reproduction of the color signal with fidelity by the recording and reproducing system is impossible due to timing errors introduced thereby.

A method of cancelling timing errors in the recovered carrier wave is disclosed in the U.S. Pat. No. 3,095,427 (issued to Ampex Corporation). In this method, in the recording of a composite color television signal a reference signal (pilot signal) of a frequency lying outside the composite color television signal frequency modulation band is simultaneously recorded and superimposed upon the composite signal and the reproduced color signal and reference signal are processed in the presence of a stable local oscillator by a frequency conversion technique involving the addition and subtraction of these three signals, thereby removing timing error components from the reproduced color signal.

The U.S. Pat. No. 2,979,588 (issued to Radio Corporation of America) disclosed another method of removing the timing errors from the reproduced color signal. In this method, a reference signal locked to timing variations in the burst signal in the recovered composite color television signal is produced and the recovered color signal is processed with the reference signal in the presence of a stable fixed frequency source to thereby remove the timing errors.

In the above prior-art methods, however, certain drawbacks are present. In the former method, the pilot signal must be separately provided and the extraction of the pilot signal involves some difficulties. In the latter method, in the production of the continuous reference signal from the burst signal it is difficult to achieve amplitude and frequency response to the timing variations with fidelity if known techniques such as a linking oscillator or APC (automatic phase control) are employed.

The principal object of the invention is to provide a method of and a system for carrying out the removal of part or all of the timing errors in the color signal component in a recovered composite color television signal containing timing error information.

According to the invention, a frequency multiplied reference signal locked to timing variations in the horizontal sync signal, which is separated from the recovered composite color television signal, is produced from the separated horizontal sync signal and the color signal component in the recovered composite color television signal and the reference signal are processed in the presence of a stable fixed oscillator by using known additive and subtractive frequency conversion techniques to thereby cancel part or all of the timing errors in the color signal component.

The above and other objects, features and advantages of the invention will best be understood from the following description, when read in connection with the accompanying drawings, in which.

Figure 1:
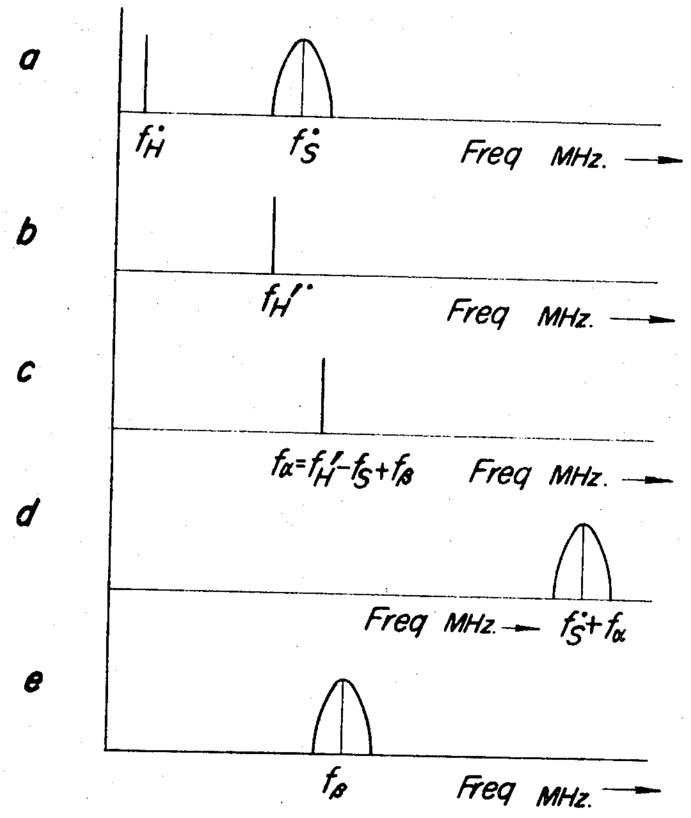
FIG. 1 illustrates the principles underlying the invention.

FIG. 1 shows the principles underlying the invention. According to the invention, the recovered color signal of center frequency $f_S$ including timing error information and the horizontal sync signal at frequency $f_H$ also including timing error information, as represented by *a* in FIG. 1, are processed to produce a reference signal with frequency $\dot{f}_H$, as represented by *b*, which is locked to phase variations in the horizontal sync signal $f_H$. The reference signal thus obtained is used, for example, to derive the $\dot{f}_S$ color signal, a frequency converted color signal having a center frequency $f_\beta$, in which the timing error component is partially or totally cancelled out.

To this end, a stable signal source tuned to a fixed frequency $f_\alpha$ ($f_\alpha$ being made equal to $\dot{f}_H - f_S + f_\beta$), as represented by *c*, is provided. This $f_\alpha$ signal and the $\dot{f}_S$ color signal are additively combined to produce a frequency converted color signal having a center frequency ($\dot{f}_S + f_\alpha$), as represented at *d*. This sum combination signal is then combined with the above noted reference signal at the frequency $\dot{f}_H$, whose timing variations are substantially the same as those of the sum signal, thus obtaining a second frequency converted color signal having a center frequency $f_\beta$. (A dotted signal such as $\dot{f}$ represents the signal which contains a timing error component.)

It is to be appreciated that the timing error component in the resultant $f_\beta$ color signal may be reduced or eliminated. If $\dot{f}_H = \dot{f}_S$, perfect cancellation of the timing error component is theoretically possible since the timing variations introduced into the $\dot{f}_H$ signal faithfully follow those in the $\dot{f}_S$ signal. Further, if $\dot{f}_H$ is not equal to $\dot{f}_S$, the timing error component introduced into the frequency signal component of the frequency difference $\dot{f}_S - \dot{f}_H$ remains throughout the process mentioned above. However, where the frequency difference $\dot{f}_S - \dot{f}_H$ is not so great, the remaining timing error component contained in the frequency signal $\dot{f}_S - \dot{f}_H$ is as small as $(\dot{f}_S - \dot{f}_H)/\dot{f}_S$ times the timing error component of the frequency signal $\dot{f}_S$, and thus the remaining timing error component can be reduced considerably.

Thus, it is advantageous that in the recording and reproduction of the NTSC composite color television signal the color subcarrier frequency is shifted to a frequency as low as possible. By so doing, the absolute magnitude of timing variations introduced by the recording and reproducing apparatus such as a VTR may be minimized.

Figure 2:
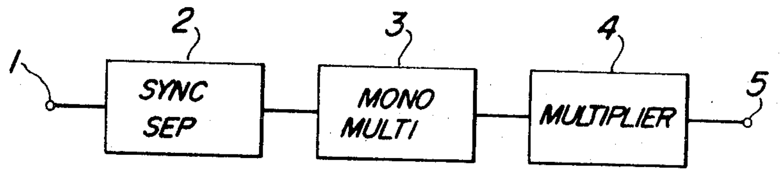
FIG. 2 is a block diagram showing an example of the method of producing frequency multiplied reference signals from the separated horizontal sync signal.

FIG. 2 shows an example of the method of producing the above noted reference signal, which is a frequency multiplied signal locked in phase to the timing variations in the horizontal sync signal. Referring to FIG. 2, a recovered composite color television signal is fed to terminal 1 and the sync signal is separated by a sync signal separator 2. The separated sync signal is differentiated to drive a 50—50 duty ratio monostable multivibrator 3, whose rectangular wave output is fed to a well-known frequency multiplier 4, which in turn provides an output as the reference signal at a desired frequency of $m/n$ times $f_H$ available at output terminal 5.

The frequency multiplier 4 may be constructed by using well known techniques of frequency multiplication employing a successive connection of harmonic band-pass amplifier, distorted wave generator, band-pass amplifier and so on.

Figure 3:
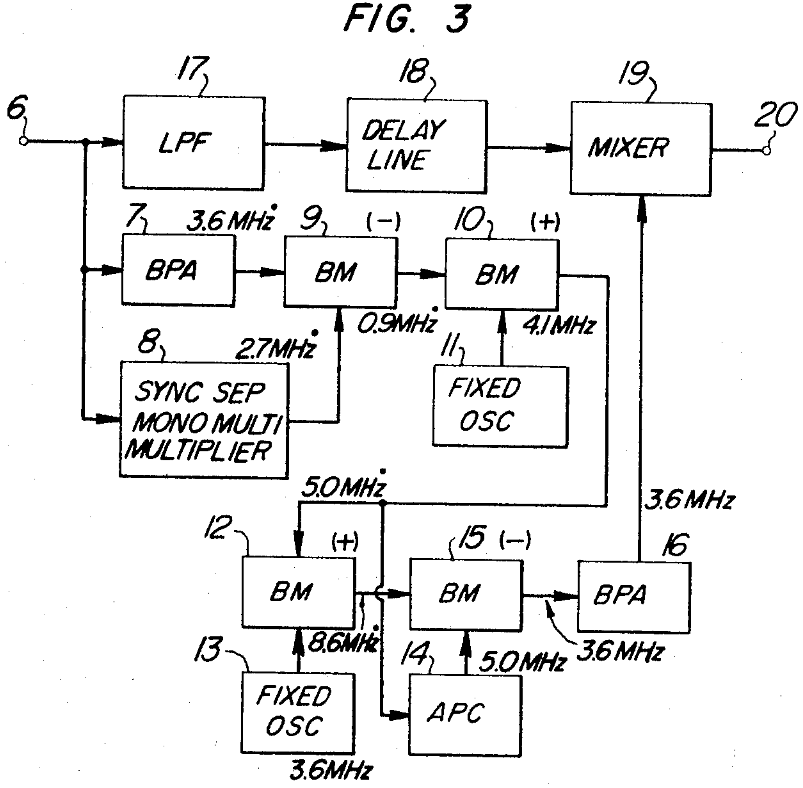
FIG. 3 is a block diagram showing an example of the practical application of the principles underlying the invention when cancelling timing errors in the chrominance signal component in the recovered composite color television signal.

FIG. 3 shows an example of the system for cancelling the timing errors or irregularities present in the color signal in a composite color television signal reproduced from, for instance, a VTR.

The reproduced composite color television signal appearing at an input terminal 6 is coupled to a bandpass amplifier 7, which separates the color subcarrier signal (3.6 ± 0.5 MHz). The input composite signal is also coupled to a circuit 8, which has the same functions as described above in connection with FIG. 2 and produces an output (reference signal) at a frequency $nf_H$ phase locked to timing variations in the horizontal sync signal. In this example, $$nf_H = 5 \times 5 \times 7 \times f_H \approx 2.7 \text{ MHz}.$$

This 2.7-MHz reference signal and the color subcarrier signal output of the band-pass amplifier 7 are coupled to a balanced modulator 9, for balanced modulation, to produce a frequency shifted color signal (0.9 ± 0.5 MHz).

It is to be noted that the timing error in the low center frequency color signal thus obtained is 0.9/3.6 = 1/4 of the corresponding timing error in the 3.6-MHz color subcarrier signal separated from the recovered composite color television signal.

The 0.9-MHz color signal is coupled to another balanced modulator 10, to which is connected a stable fixed oscillator 11 oscillating at a frequency of 4.1 MHz, and which produces a high frequency shifted color signal (5.0 ± 0.5 MHz) having a sum frequency of 5.0 MHz as the center frequency. In this high frequency shifted color signal, the timing error is further reduced by a considerable extent. Thus, this signal can be processed for the cancellation of residual timing errors by well-known methods such as a timing error cancelling method shown in FIGS. 1a and 1b of the U.S. Pat. specification No. 2,979,558 issued to Radio Corporation of America and a timing error cancelling method shown in FIG. 2 of the U.S. Pat. Specification No. 2,921,976.

In the present example, this 5.0-MHz color signal is coupled to a further balanced modulator 12, to which is connected a stable fixed oscillator 13 oscillating at a frequency of 3.6 MHz, producing a further frequency shifted color signal having a still higher center frequency of 8.6 MHz. The 5.0-MHz color signal is also coupled to an APC 14, to produce a continuous signal synchronized to the color burst (5.0 MHz) and following the residual timing errors. The 8.6-MHz color signal and the 5.0-MHz continuous signal are coupled to another balanced modulator 15, for balanced modulation, to produce a low frequency shifted color signal (3.6 ± 0.5 MHz) having a difference frequency of 3.6 MHz as the center frequency. In this resultant 3.6-MHz low frequency shifted color signal the timing error components are completely cancelled. This color signal is fed to a band-pass amplifier 16 to filter out undesirable components. The color signal output of the band-pass amplifier 16 free from undesirable components is mixed in a mixer 19 with the luminance signal output of a LPF 17 free from the chrominance signal component derived from the recovered composite color television signal. Thus, the mixer 19 provides a recovered composite color television signal output in which the chrominance signal timing errors are cancelled. A delay line 18 is inserted to compensate for the time difference between the luminance signal processing circuit and the chrominance signal processing circuit. The APC 14 is of a well-known construction found in usual television receiving sets, producing a continuous output locked in frequency and phase to the intermittent burst input.

In the preceding embodiment, timing errors in part of the color video signal are cancelled in accordance with the present invention, and the remainder of the introduced timing variations are completely removed by well-known color television signal reproducing techniques. The chrominance signal timing error compensated composite color television signal derived in the above manner can reduce the difficulty in the conventional color television signal reproducing technique in following the APC burst output, thus providing equivalent effects of stabilizing the APC operation. In the preceding embodiment, the 4.1-MHz fixed oscillator is used to produce the 5.0-MHz color signal output for the sole purpose of preventing harmonic components from being introduced in the color signal output of the succeeding stage balanced modulator.

Figure 4:
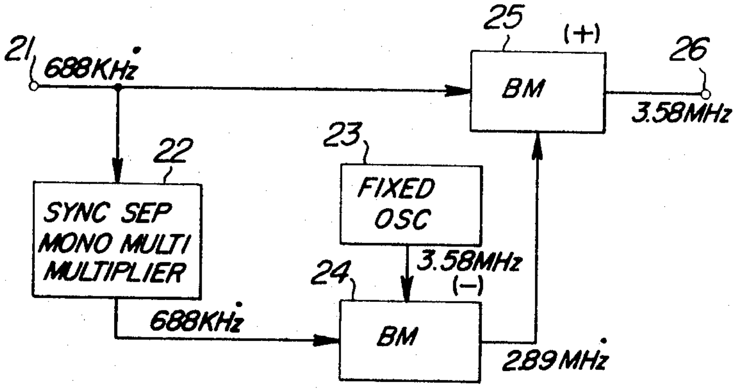
FIG. 4 is a block diagram showing another example of the application of the principles underlying the invention.

FIG. 4 shows an example of completely cancelling the timing variations in the recovered color signal. In this example, a recovered, low frequency shifted color signal containing timing error information is processed for timing error cancellation to provide a regular color signal.

The low frequency shifted color signal reproduced from a VTR is impressed on an input terminal 21. In this example, it is assumed that the center frequency of the input signal is 688 kHz, which is 5/(2 × 13) times the standard color subcarrier frequency $f_S$ = 3.58 MHz. The frequency $f_S$ is expressed in terms of the horizontal sync frequency as $$f_S = (13 \times 7 \times 5)/2 \times f_H.$$

A circuit 22, which has the same functions as described in connection with FIG. 2, produces a frequency multiplied, reference signal of a frequency equal to the center frequency 688 kHz of the recovered input color signal, that is, a frequency equal to (5 × 7 × 5)/4 times the horizontal sync frequency $f_H$. The 688-kHz reference signal from the circuit 22 is coupled to a balanced modulator 24, to which is connected a stable fixed oscillator 23 oscillating at a frequency of 3.58 MHz, and which produces a 2.89-MHz output containing timing variations in the opposite sense. This output signal and the 688-kHz color signal are combined by a balanced modulator 25 to produce a 3.58-MHz NTSC color signal. In the balanced modulator 25, the timing error is completely cancelled, since the timing error in the 688-kHz signal is the same in magnitude as and opposite in sense to that in the 2.89-MHz signal.

In the foregoing, the principles underlying the invention and some embodiments of the invention have been described. It will be apparent, however, that various other changes and modifications in the organization and mode of operation are possible without departing from the scope and spirit of the invention.

Since it is important to effectively cancel the timing variations introduced in the recording and reproduction of television signals from a VTR and other means in order to stabilize particularly the display of the reproduced signals, it is to be seen that the invention provides solutions to various technical difficulties encountered in television signal recording and reproducing systems.

What is claimed is:

1. A color television signal reproducing system for obtaining a frequency shifted color signal containing a reduced timing error component from a recovered composite color television signal including timing error information comprising:

a. first means for separating the horizontal synchronization signal from said recovered composite color television signal;

b. means, connected to said separating means, for multiplying said separated horizontal synchronization signal to provide a frequency multiplied reference signal having a predetermined frequency and phase locked to timing variations in said horizontal synchronization signal;

c. second means for separating the color signal from said recovered composite color television signal; and d. first means for combining said reference signal and said separated color signal to produce said frequency shifted color signal containing a reduced timing error component.

2. A color television signal reproducing system according to claim 1 wherein said frequency shifted color signal produced by said first combining means represents the difference between said reference signal and said separated color signal.

3. A color television signal reproducing system according to claim 1 further comprising:

a. means for providing a stable frequency source signal at a predetermined frequency; and b. second means for combining said frequency shifted color signal and said stable frequency source signal to produce a sum frequency signal.

4. A color television signal reproducing system according to claim 1, which further comprises means for producing a continuous signal at a desired frequency and phase locked to timing variations in a burst signal extracted from said frequency shifted color signal containing a reduced timing error component.

* * * * *